Figure 1:
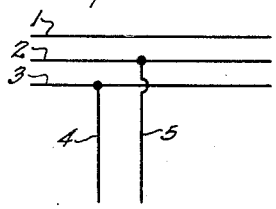

INVENTORS.
WILLIAM D. KYLE, JR.
ANTHONY VAN RYAN
BY Chester W. Brown
ATTORNEY.

Patented Oct. 19, 1948

2,451,622

UNITED STATES PATENT OFFICE 2,451,622

METHOD OF TRANSPOSING CONNECTIONS

William D. Kyle, Jr., Milwaukee, and Anthony Van Ryan, South Milwaukee, Wis., assignors to Line Material Company, a corporation of Delaware Original application April 15, 1943, Serial No. 483,160. Divided and this application August 17, 1945, Serial No. 611,194

1 Claim. (Cl. 171—97)

This invention relates to electric power transmission and distribution systems and has to do with a new method of procedure in the effectuation of line wire transpositions, whereby service interruptions are avoided.

This application is a division of our Letters Patent No. 2,399,044 covering a "Transfer switch," issued April 23, 1946.

In the transmission and distribution of electric power over three-wire systems, either single-phase or three-phase, it is desirable to balance the load so that each phase, in the case of three-phase transmission, or each pair, in the case of single-phase three-wire transmission, carries, as nearly as practicable, its pro-rata share. But due to uncontrollable changes in consumer requirements, it often happens that the line becomes badly unbalanced, making it necessary from time to time to transfer one or more service lines or one or more distribution lines, as the case may be, from one pair of feeder lines to another—thus restoring the balance or, at least, reducing the degree of unbalance.

To effect such a transfer by first cutting one connection and then establishing another entails a service interruption which, though perhaps of short duration, is inevitably long enough to stop all the clocks on the affected line beside deactuating any magnetically operated motor starters that may be connected thereto.

The primary object of this invention is to devise a method whereby the aforementioned transfers can be effected without interrupting the power supply long enough to interfere with the continued operation of equipment connected to the branch line, while at the same time precluding the occurrence of momentary short circuit during transfer operation.

In the drawings which accompany this specification:

Figs. 1 to 6, inclusive, are a series of diagrams illustrating, step to step, our new method of effecting transpositions without objectionable service interruption.

Fig. 1 shows, diagrammatically, a three-wire transmission line or distribution line, as the case may be, comprising three wires, 1, 2, and 3 respectively, and a two-wire distribution or service line comprising wires 4 and 5, respectively. For convenience of description, the line which comprises wires 1, 2, and 3 will be referred to as a feeder whereas the line connected thereto and comprising wires 4 and 5 will be referred to as a branch line. The feeder may be either a three-phase or a three-wire single-phase line. In the latter case wire 2 would be the grounded neutral to which one of the two branch line wires would in all cases be connected, the other branch line wire being connected to either of the remaining two feeder wires—it being understood that in those cases where the branch line is of the three-wire variety the present invention has no application.

If the feeder is of the three-phase variety and the connected branch line of the single-phase two-wire variety, the two conductors 4 and 5 can be connected to any two of the feeder wires. In either event, the connection between a two-wire branch line and a three-wire, alternating current feeder line can always be transferred from any given pair of the latter to any other pair of the same by making a single transposition. By way of clarification of that statement, it is pointed out that wires 4 and 5 (Fig. 1) can be connected across feeder wires 1 and 3 by transposing wire 5 only, or that wires 4 and 5 can be connected across wires 1 and 2 by transposing wire 4 only.

Figure 2:
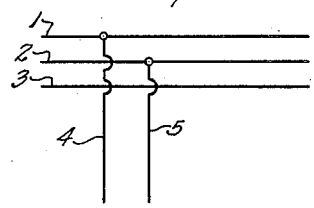

As an example of the procedure which we follow in effecting a transfer, we have arbitrarily assumed that the connection at the outset is as shown in Fig. 1 and that it is the intention to cut over to the connection shown in Fig. 2. But it is to be noted that the same procedure would be followed if the connection were to be transferred to feeder wires 1 and 3, except that wire 5 would be cut over instead of wire 4.

Figure 3:
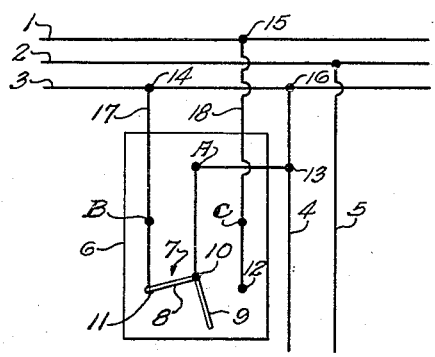

The first step is portrayed in Fig. 3 wherein a transfer switch is shown diagrammatically and identified as a whole by reference numeral 6. The switch is a single-pole, double-throw model, of which the three external terminals are marked A, B, and C, respectively, while the blade is identified by reference numeral 7. The blade is composed of two arms 8 and 9, but, except for mechanical reasons, a single arm blade would do equally well. The switch blade is pivoted at 10 and the pivotal point is connected directly to terminal A—which is the mid-point terminal. For want of more descriptive terminology and to facilitate differentiation between the three terminals of the transfer switch, the expression "A terminal" will be employed in this specification and the appended claim to designate the midpoint terminal, and the expressions "B terminal" and "C terminal" may be taken to mean, respectively, either of the two terminals so marked in Fig. 3. It will be observed that the B and C terminals are completely alternative and, therefore, the designations B and C depend entirely upon which way the switch happens to be thrown at the outset of the operation.

Arm 8 is shown in engagement with a fixed contact 11, which is connected to terminal B, and arm 9 will engage fixed contact 12 when the switch is thrown to its alternate position. Contact 12 is connected to terminal C.

In Fig. 3 the branch line wires 4 and 5 are shown connected to the feeder line as in Fig. 1, and it will be seen that the wire 4, which is the one to be transposed, has been connected to the mid-point terminal A while the B terminal has been connected to wire 3 by means of conductor 17—the switch blade being in a position to complete a conductive path from junction 13 to junction 14. In addition, terminal C has been connected at junction 15 to wire 1 by means of conductor 18.

Figure 4:
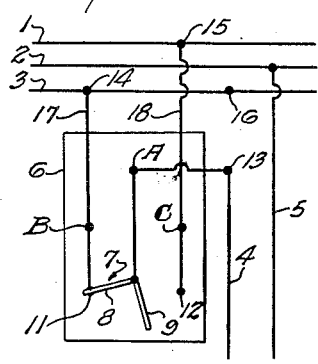

Proceeding to Fig. 4, it will be seen that wire 4 has been cut to sever the connection between junctions 13 and 16 and the wire 4 retains its connection to wire 3 via arm 8 of the switch blade.

Figure 5:
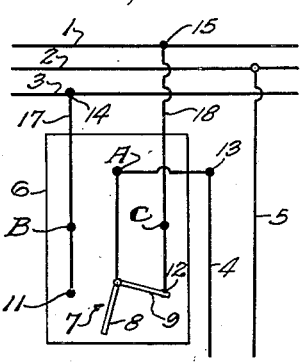
Figure 6:
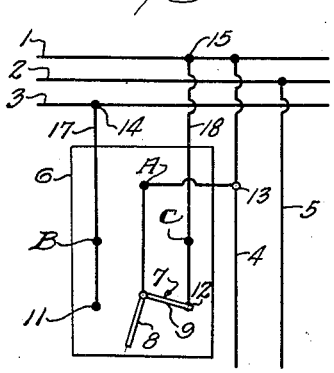

The next step consists in throwing the switch to its alternate position—see Fig. 5. This brings about the desired transfer, and, since the switch operates very rapidly, the circuit is broken for only a very small fraction of a second—a period insufficient to cause stoppage of clocks or deactuation of magnetically operated motor starters. It is, however, essential that the transfer switch break before making contact because otherwise lines 1 and 3 would be momentarily shorted.

The transfer having been effected as above described, wire 4 is connected directly and permanently to wire 1 (see Fig. 6), which brings about the conversion from Fig. 1 to Fig. 2, as intended. All connections between the transfer switch and the several wires 1, 3, and 4, as exhibited in Fig. 6, can then be broken—the job having been completed.

The procedure in every instance is the same and it may be summarized as follows: (1) the mid-point or A terminal of the switch is connected to the branch wire whose connection is to be transposed; (2) the B terminal is connected to the same feeder wire as that to which the branch wire-to-be-transposed is connected at the outset and the C terminal is connected to the alternate feeder wire; (3) the original connection between the wire to be transposed and its connected feeder wire is cut; (4) the switch is operated so as to connect the A terminal with the C terminal via the switch blade; (5) the wire whose connection is to be transposed is connected directly and permanently to the alternate feeder wire; (6) all connections to the transfer switch terminals A, B, and C are broken.

The B terminal is hereby defined as the one, other than the mid-point terminal, to which the switch blade is connected at the beginning of the operation—as per Figs. 3 and 4.

The C terminal is hereby defined as that one, other than the mid-point terminal, to which the switch blade is not connected at the beginning of the operation—as per Figs. 3 and 4.

The "alternate feeder wire" is hereby defined as that one of the three feeder wires to which neither of the two branch line wires is connected at the beginning of the operation; also as that feeder wire to which the branch wire-to-be-transposed will be connected at the completion of the operation.

It will be seen that the determination of B and C terminals depends upon the position of the switch at the outset of the operation in conformity with the above stated definition.

The switch described in detail in our Letters Patent No. 2,399,044 covering a "Transfer switch," issued April 23, 1946, may effectively be used to carry out the method hereinabove described, though any switch having similar operating characteristics may be employed.

We claim:

The method of transferring a single-phase electric branch line connection from a first line of one phase of a three-phase feeder circuit to a second line of another phase of said feeder circuit, said method comprising; shunting said branch line connection through a double throw snap switch, removing said branch line connection from said first line, connecting said second line to a neutral pole of said snap switch, actuating said snap switch, first, to quickly open the circuit to said branch line from said first line and, second, to subsequently close the circuit to said branch line from said second line, permanently connecting said branch line with said second line in shunt relation to said switch, and disconnecting said snap switch from said branch line, first line and second line.

WILLIAM D. KYLE, Jr.
ANTHONY VAN RYAN.

No references cited.